May 30, 1967  J. HEATHCOTE  3,322,640
INTEGRATED STEAM GENERATING NUCLEAR REACTOR SYSTEM
Filed June 29, 1965
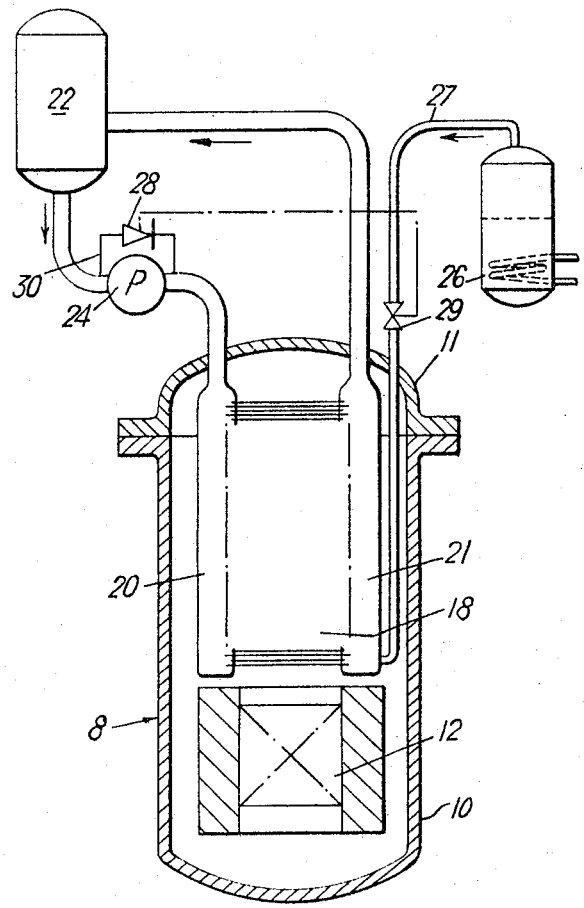

3,322,640
INTEGRATED STEAM GENERATING NUCLEAR
REACTOR SYSTEM
John Heathcote, London, England, assignor to United
Kingdom Atomic Energy Authority, London, England
Filed June 29, 1965, Ser. No. 468,037
Claims priority, application Great Britain, June 29, 1964,
26,820/64
4 Claims. (Cl. 176—53)

This invention relates to vapour generators and it is to be understood that where, herein, the words "water" and "steam" are used, they are intended to denote any liquid and its vapour unless the context requires otherwise.

More specifically, the invention is concerned with a so-called integrated nuclear reactor/steam generator system in which the heating surface is housed in the same vessel as the reactor core so as to be heated by the primary coolant fluid from the core. Such systems have the advantage over systems in which the steam generator is outside the reactor vessel of compactness and saving of pipework and are therefore, of particular interest in marine applications.

In such an integrated system the heated fluid, which will generally be water, is circulated under pressure and if the forced circulation pump or pumps were to fail, as for example as a result of an electrical failure, disastrous consequences could follow unless a sufficiently vigorous natural circulation takes place to remove the so-called decay heat of the reactor core. The difficulty in obtaining a vigorous natural circulation occurs particularly when the systems are used in marine applications since height is strictly limited and the steam and water drum cannot be placed high enough above the heating surface to give the required natural circulation.

By a judicious arrangement of the heating surface, a degree of natural circulation of the steam/water mixture can be provided, but it is most advisable that some means be provided for initiating the natural circulation and/or maintaining it in times of special need.

In accordance with the invention there is provided an integrated nuclear reactor/steam generator system in which the heating surface is constituted by steam generating tubes connected between inlet and outlet headers, the flow through these tubes being maintained by one or more forced circulation pumps, and in which an auxiliary boiler is provided from which steam under pressure can be injected into the steam generator so as to induce or maintain sufficient natural circulation through the steam generating tubes to remove the decay heat of the reactor should the forced circulation pump or pumps fail.

The invention is most useful in connection with integrated systems in which the banks of tubes extend substantially horizontally and are connected between substantially vertical headers which, preferably, pass through the upper end of the reactor vessel.

Also, in order to reduce the pressure drop across the system and thereby assist the desired natural circulation a by-pass may be arranged across the pump or pumps should these fail.

An example of an integrated system in accordance with the invention will now be described with reference to the accompanying diagrammatic drawing which is a combined sectional elevation and flow diagram.

The system 8 shown comprises a closed upright cylindrical reactor vessel 10 having a lid 11 and housing in its lower end a reactor core 12. Above the core are positioned the heating surfaces comprising a number of horizontal tubes 18 extending between a pair of substantially vertical inlet and outlet headers 20 and 21, respectively.

The tubes are heated by the primary coolant which takes up heat from the core 12 and is circulated by pumps not shown within the vessel 10 past the tubes 18.

The outlet header 21 leads to a steam and water drum 22, the water from which is recirculated to the inlet header by a pump 24. Feed water is fed to this drum and steam is removed from it in the usual way through pipes not shown.

An auxiliary boiler 26 is provided which is heated by any power supply means not dependent upon the system 8. The steam outlet from this boiler is connected by a line 27 to the lower end of the outlet header 21 and a valve 29 is interposed in this line.

If the circulating pump 24 were to fail for any reason, natural circulation of the water could be expected to continue at least to some extent. However, if it did not, or it were not sufficiently vigorous, it can be induced or promoted by the injection of steam into the header 21 from the auxiliary boiler 26 by opening the valve 29. This valve could, if desired, be operated automatically through conventional control gear as a result of the pump ceasing to operate or as a result of the rate of circulation of the water falling below a predetermined limit. It will be appreciated that a head of steam must be maintained in the boiler 26 at all times so as to allow its immediate use.

The effect of the injection of steam into the outlet header 21 is to increase the density differential between the inlet and outlet headers and thus to induce circulation or increase the rate of circulation.

The decay heat of the reactor core may often amount to as much as 7% of the maximum heat obtainable from the core and can last in appreciable amounts for as long as several hours. The capacity of the boiler 26 must therefore be chosen in accordance with the decay heat of any particular reactor core so that sufficient steam for a sufficiently long time is available to maintain the necessary natural circulation.

When operating under natural circulation or induced circulation, it is, of course, desirable that the pressure drop across the system be reduced as far as possible and, to this end a by-pass 30 having a valve 28 may be provided around the circulating pump 24. This valve may be opened automatically at the same time as the valve 29.

It will be appreciated that by a simple expedient the invention gives a high degree of security against possibly catastrophic results due to failure to remove the decay heat of the reactor.

What is claimed is:

1. An integrated steam generating nuclear reactor system of the type wherein heating surfaces at which the steam is generated are housed in the same vessel as a core of the reactor and are heated by a primary coolant passed through the core, said system comprising steam generating tubes constituting the heating surfaces, inlet and outlet headers between which the steam generating tubes extend, said headers being connected to a steam circuit external to the vessel, and circulating pump means for circulating steam through the system, an auxiliary boiler means for providing a store of steam under pressure, and means for selectively introducing a flow of the steam stored in the auxiliary boiler means into the said outlet header to promote flow through the steam generating tubes in the event that the circulating pump means fails to circulate steam through the system.

2. A system according to claim 1, wherein the heating surfaces at which the steam is generated are constituted by banks of substantially horizontal steam generating tubes connected between substantially vertical inlet and outlet headers.

3. A system according to claim 1, wherein a by-pass is provided around the circulating pump means and a normally closed valve in the by-pass is openable selectively to allow the pump means to be by-passed and thereby to reduce the circuit pressure drop when the pump means fails.

4. A method for maintaining flow in the steam generating tubes of a steam generating nuclear reactor of the type in which the steam generating tubes extend between inlet and outlet headers within the same vessel as houses a core of a reactor and in which the tubes are heated by a primary coolant passing through the core and pumping means circulates the steam through the tubes comprising the steps of: maintaining available in an auxiliary boiler a store of steam under pressure and introducing a flow of the stored steam into the outlet header in the event of a failure of the pumping means.

References Cited

UNITED STATES PATENTS

| | | | |
|---|---|---|---|
| 3,085,964 | 4/1963 | Ritz et al. | 176—60 X |
| 3,150,051 | 9/1964 | Ammon | 176—61 X |

FOREIGN PATENTS

| | | |
|---|---|---|
| 637,847 | 1/1964 | Belgium. |
| 971,423 | 9/1964 | Great Britain. |

REUBEN EPSTEIN, *Primary Examiner.*